(12) United States Patent
Beck

(10) Patent No.: US 12,268,107 B1
(45) Date of Patent: Apr. 8, 2025

(54) HAND SHOVEL FOR PLACER MINING

(71) Applicant: Timothy Beck, Wasilla, AK (US)

(72) Inventor: Timothy Beck, Wasilla, AK (US)

( * ) Notice: Subject to any disclaimer, the term of this patent is extended or adjusted under 35 U.S.C. 154(b) by 633 days.

(21) Appl. No.: 17/680,743

(22) Filed: Feb. 25, 2022

(51) Int. Cl.
  F24B 15/06  (2006.01)
  A01B 1/02   (2006.01)
  A47L 13/52  (2006.01)
  F24B 15/08  (2006.01)

(52) U.S. Cl.
  CPC .................................. A01B 1/022 (2013.01)

(58) Field of Classification Search
  CPC .......... F24B 1/915; F24B 15/06; F24B 15/08; A01B 1/022; A47L 13/52
  USPC ..................... 294/9, 177; 15/257.6
  See application file for complete search history.

(56) References Cited

U.S. PATENT DOCUMENTS

| 760,467 A | * | 5/1904 | Michaud | |
|---|---|---|---|---|
| 953,756 A | * | 4/1910 | Olson | |
| 1,762,347 A | * | 6/1930 | Peebles | F24B 15/06 294/177 |
| 2,315,831 A | * | 4/1943 | Wilcox | A62C 3/06 294/51 |
| 4,299,419 A | | 11/1981 | Kalan | |
| 4,305,376 A | * | 12/1981 | Neugent | F23J 1/04 294/9 |
| 4,709,440 A | * | 12/1987 | Conelly | E01H 1/006 15/257.3 |
| 6,135,520 A | * | 10/2000 | Miller | E01H 1/1206 294/1.4 |

* cited by examiner

*Primary Examiner* — Douglas A Hess

(57) ABSTRACT

A shovel that has an upper container and a closed lid. The lid is hinged so that once a load of gravel has been dug, the lid can be closed, and the shovel brought to the surface with the load of gravel largely intact. The device has a typical shovel bed onto which side panels have been added. A lid, shaped to fit the shape of the shovel, is attached to the shovel by a hinge. A curved bracket holds a spring that also attached to the lid to ensure the lid closes tightly. The shovel has a handle, as is typical for the standard shovels. However, the invention includes a pivoting handle attached to the straight handle that has a small cable attached. The other end of the cable attaches to the lid. The pivoting handle is used to open and close the lid.

10 Claims, 11 Drawing Sheets

HAND SHOVEL FOR PLACER MINING

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to hand shovels and particularly to hand shovels for placer mining.

2. Description of the Prior Art

Mining, especially placer mining involves sifting through large amounts of gravels to find desired minerals, such as gold for example. There are many ways to mine the gravels- from large scale mining in which heavy equipment moves hundreds of yards of earth over large screens called sluices. Small scale mining and prospecting, however, relies on simpler tools and methods. Many use a simple shovel to dig gravel from a riverbed. When the riverbed is underwater, however, there are problems. Often, after the shovel had taken a scoop of gravel, the act of removing it from the water causes the water to wash the gravel from the shovel. This is a problem that makes such mining or prospecting difficult.

BRIEF DESCRIPTION OF THE INVENTION

The instant invention overcomes the problem discussed above. It is a shovel that has an upper container and a closed lid. The lid is hinged so that once a load of gravel has been dug, the lid can be closed, and the shovel brought to the surface with the load of gravel largely intact. The device has a typical shovel bed onto which side panels have been added. A lid, shaped to fit the shape of the shovel is attached to the shovel by a hinge. A curved bracket holds a spring that also attached to the lid to ensure the lid closed tightly. The shovel has a long handle, as is typical for the standard shovels. However, the invention includes a pivoting handle, attached near the end of the long handle, which has a small cable attached. The other end of the cable attaches to the lid. A user pulls the handle back to open the lid. The user then digs into the gravel and after securing a load of gravel, pushes the handle forward, which causes the handle to close. Once closed, the user can extract the shovel and gravel from the water. Once on dry ground, the user can open the shovel and dump the gravel into a sluice, a bucket or other place to inspect the gravel for metals that may be in the gravels.

DETAILED DESCRIPTION OF THE INVENTION

Figure 1:
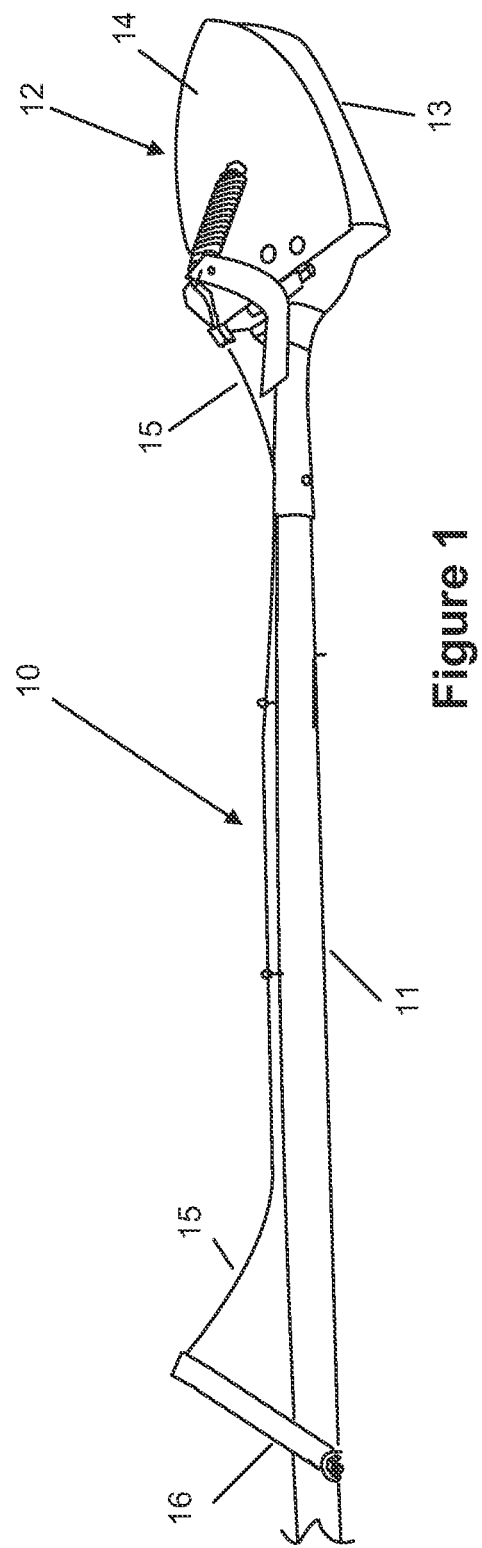
FIG. 1 is a detail view of the invention showing the lid closed.
Figure 2:
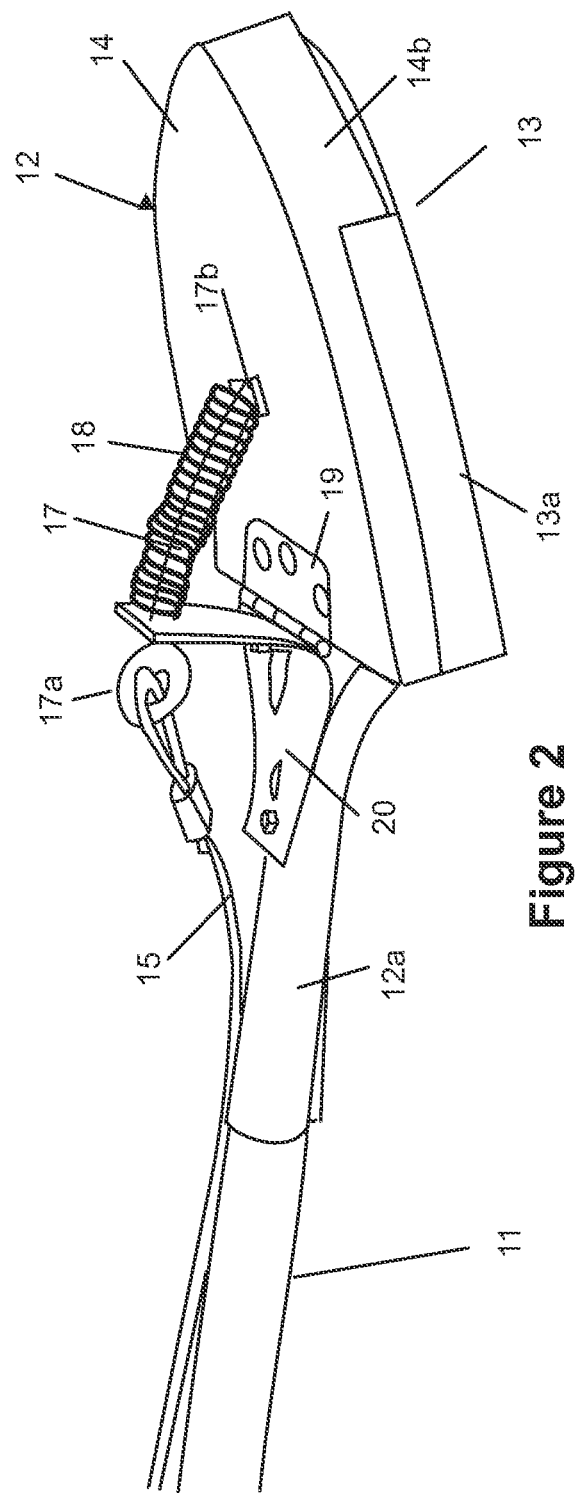
FIG. 2 is a detail view of the closed lid.
Figure 3:
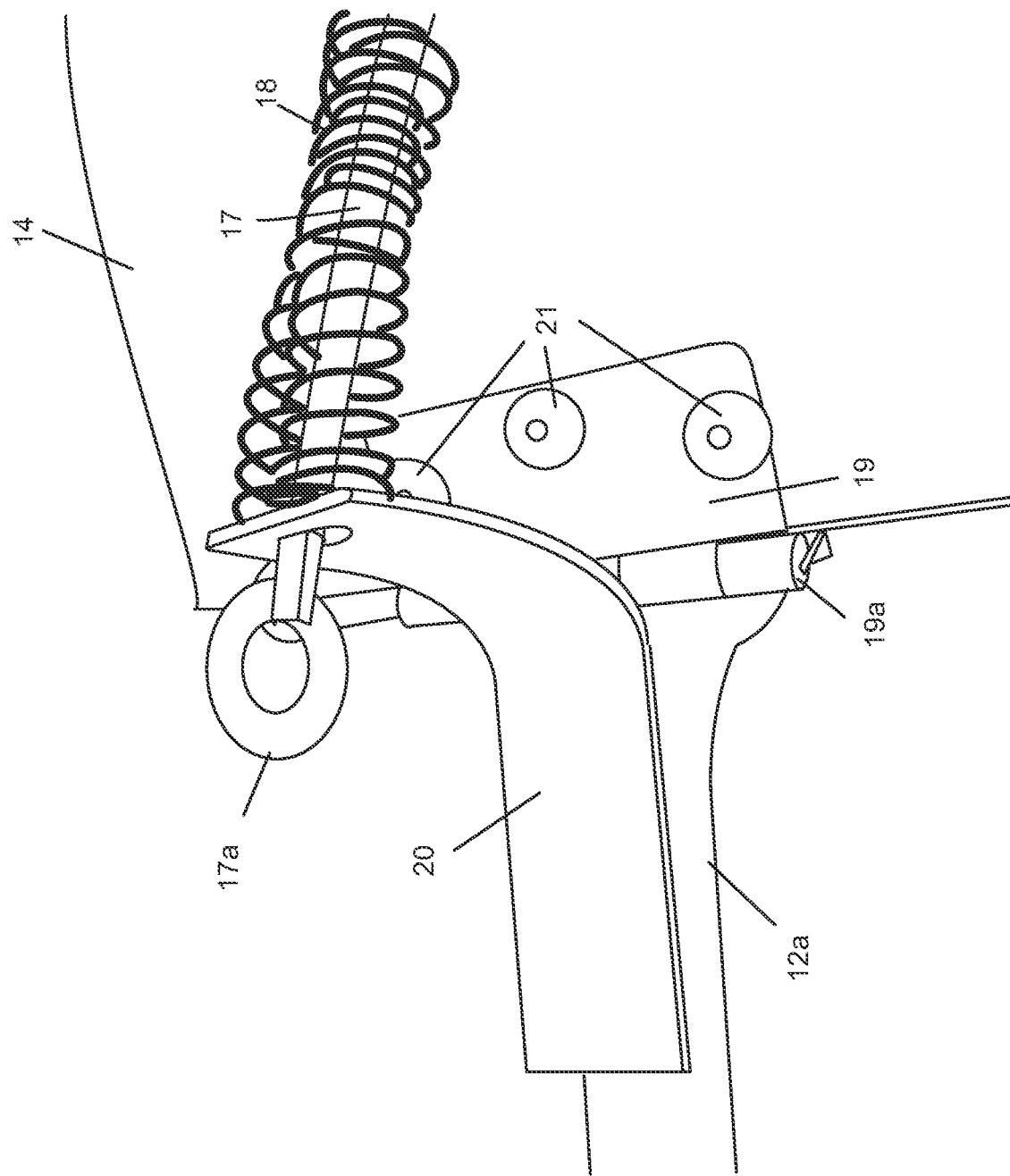
FIG. 3 is a detail view of the spring and bracket of the invention.

Referring now to the figure and particularly to FIGS. 1, 2 and 3, FIG. 1 is a detail view of the invention showing the lid closed. Here, the invention 10 is shown in a side perspective view. The invention 10 is a shovel that has a handle 11, and a head 12. The head 12 has two main parts. First is the bottom 13. The second is a top 14. The top 14 is hinged to the bottom 13 as discussed below. The top is opened by a cord 15 and a pivoting handle 16. The cord 15 is attached to a spring-loaded rod 17 (see FIG. 3), and the pivoting handle 16. As the pivoting handle 16 is pulled back, the cord causes the lid to open, as discussed below.

Figure 8:
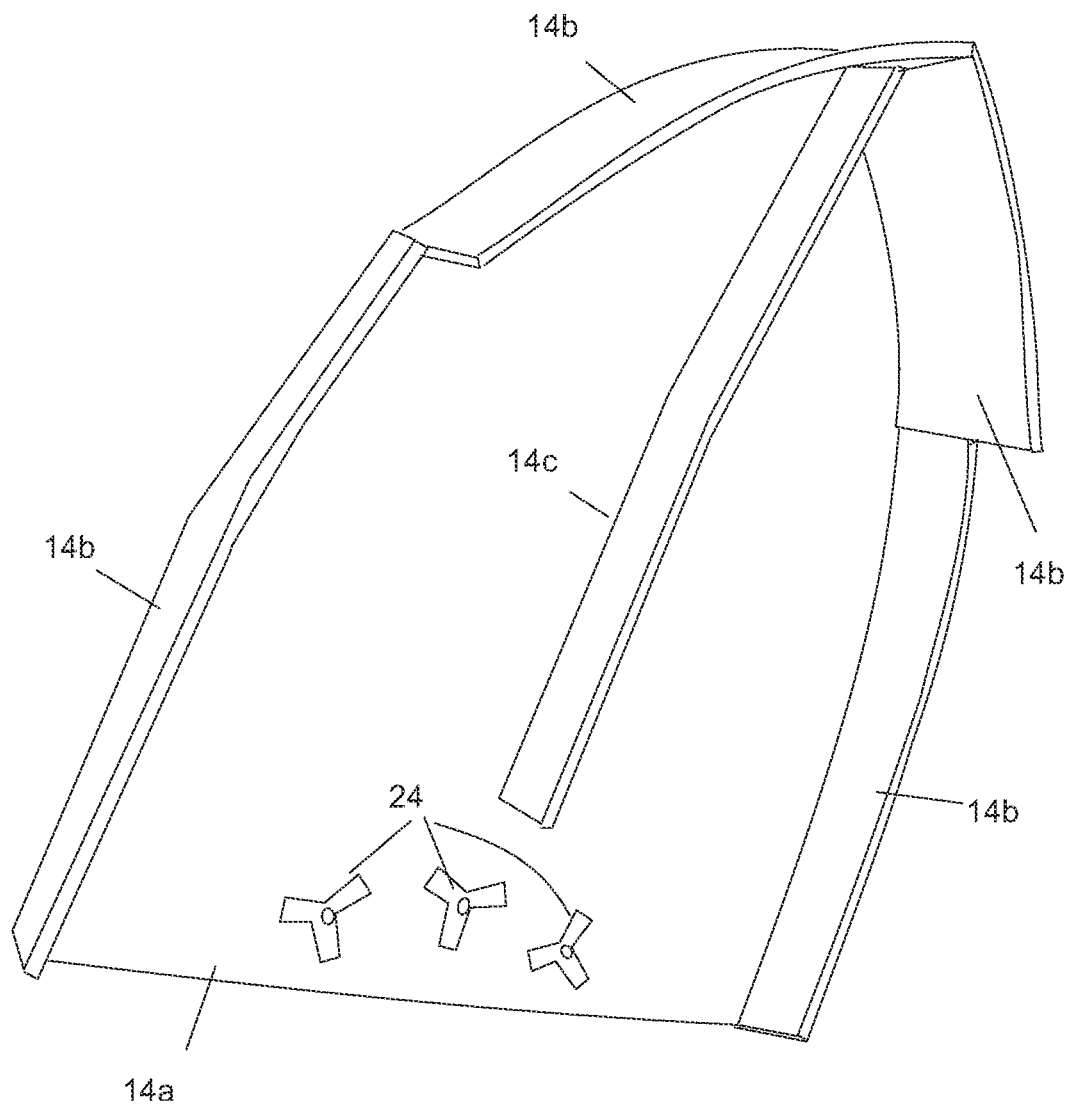
FIG. 8 is a detail view of the inside of the lid showing the buildup of walls on the front and sides of the lid.

FIG. 2 is a detail view of the closed lid. In this view, the head 12 and its key elements are shown. The bottom 13 of the head 12 has a curved (or flat) shovel base (see, FIG. 5) onto which side plates 13a and a back plate 13b have been added. The lid 14 has a generally flat top 14a and two side plates 14b that run along both sides of the lid 14. FIG. 8 shows details of the inside surface of the lid 14a. As noted above, a cord 15 runs from the pivoting handle 16 to the rod 17. Note that the rod 17 has an eye 17a formed as shown. The cord 15 is secured to the eye by any suitable means. In the figure, it is shown passing through the eye in a loop which is secured by a cable clamp 15a. A spring 18 is placed around the rod 17 as shown. The rod is secured to the lid by welding it at point 17b as shown. A hinge 19 is attached to lid 14 and to the back plate 13b as discussed below. An angle bracket 20 is attached to the shovel socket 12a. The bracket 20 is angled upward so that the rod is elevated with respect to the lid 14 so that the lid can be opened when the rod is pulled.

FIG. 3 is a detail view of the spring and bracket of the invention. In this view, the bracket 20 is shown attached to the socket 12a. The rod 17 is shown within the spring 18. The eye 17a is shown attached to the rod 17b. The hinge 19 is shown as well. Note that the lower portion 19a of the hinge 19, that is attached to the back plate 13b is shown. Note too that the hinge 19 is secured to the top by three fasteners 21. More details of the fasteners are shown in FIG. 8 as discussed below.

Figure 4:
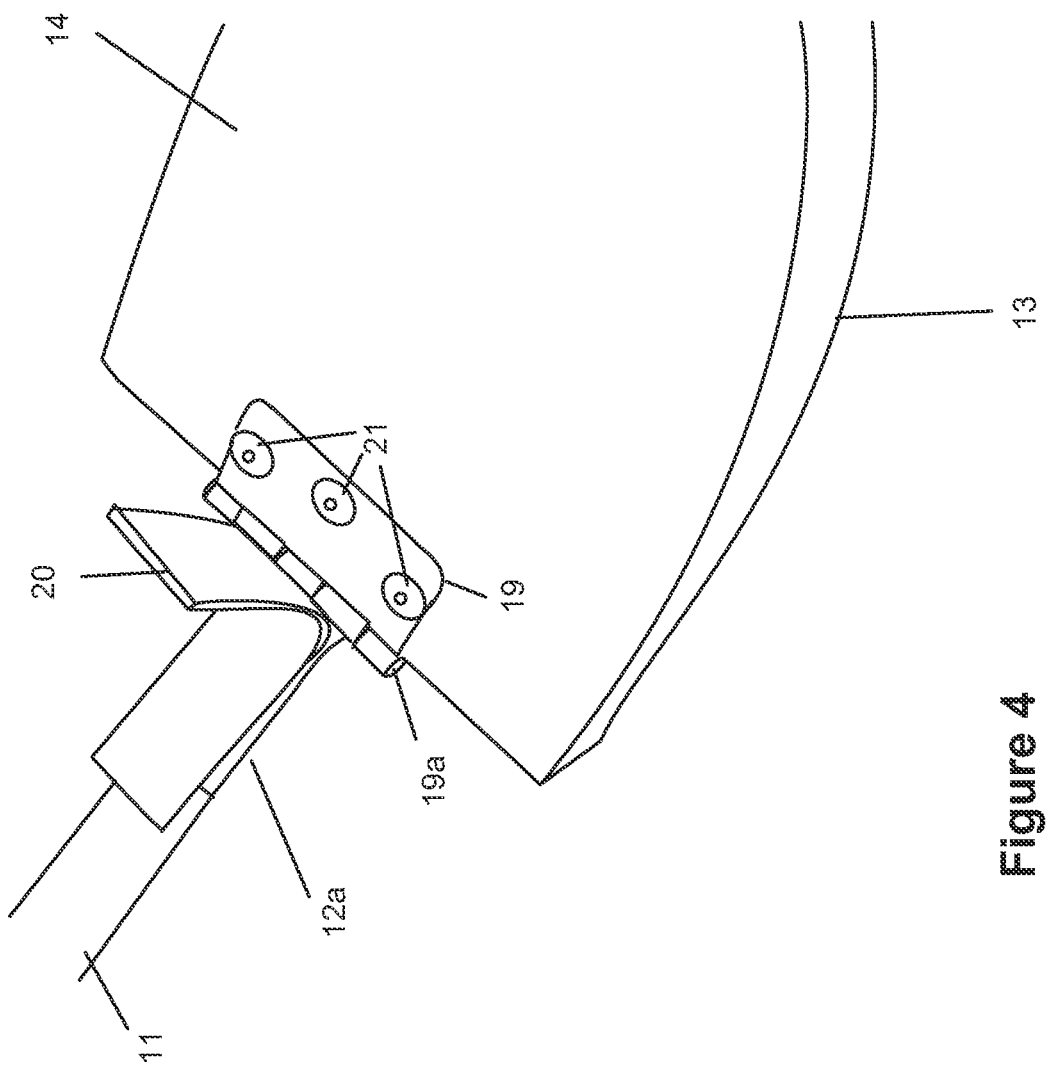
FIG. 4 is a detail view of the lid showing the hinge and bracket.

FIG. 4 is a detail view of the lid showing the hinge and bracket. In this view, the hinge 19 and the bracket 20 are shown without the other components. Note that the hinge 19 is secured by the three fasteners 21. The fasteners can be of any type of fasteners. In the preferred embodiment, they are rivets. Note the top 14, a section of the bottom 13 and the handle 11 are also shown.

Figure 5:
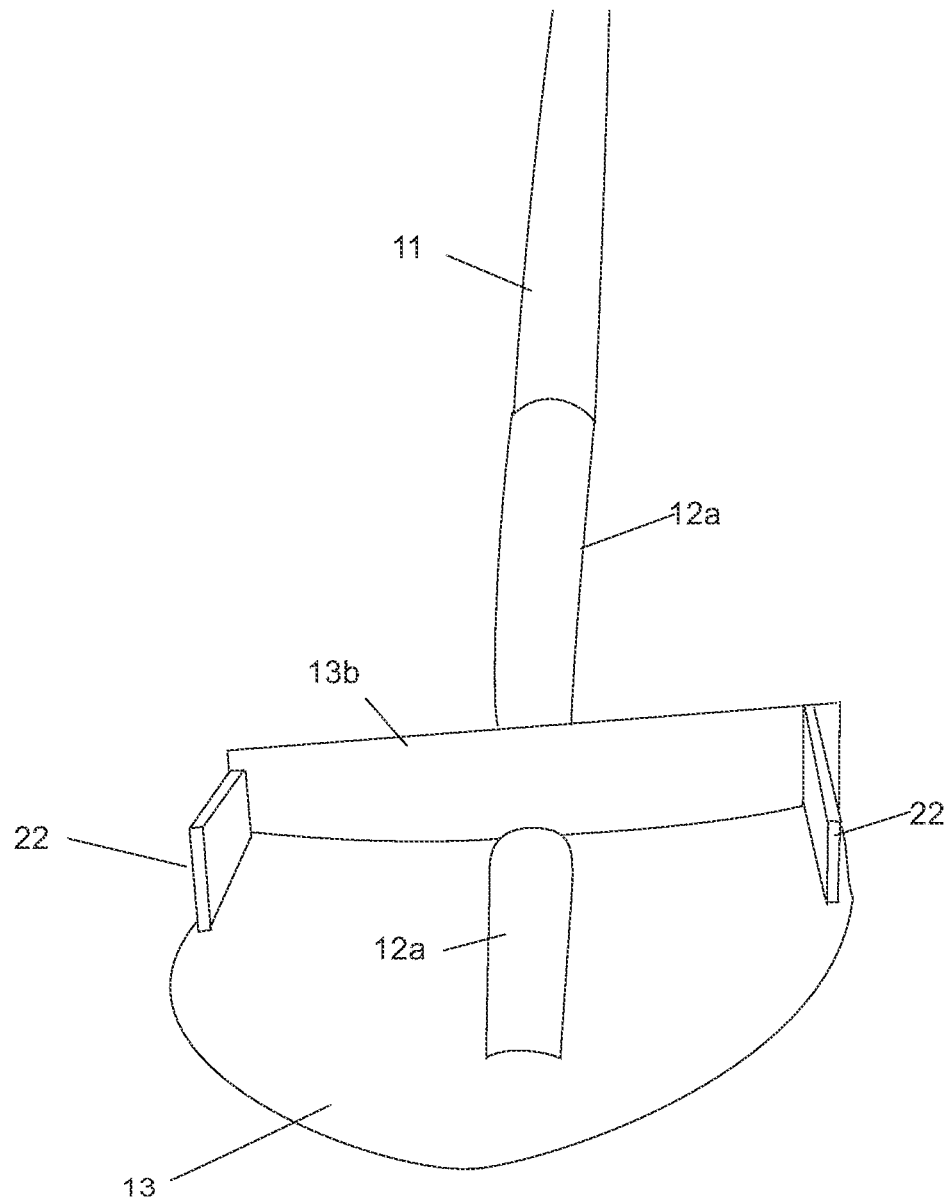
FIG. 5 is a front view of the shovel body showing rear and sidewalls that have been added.

FIG. 5 is a front view of the shovel body showing rear and sidewalls that have been added. Here, the handle 11, the socket 12a and the bottom 13 of the device are shown. Note that in the preferred embodiment, the head bottom 13 is curved. Note too, the socket extends into the bottom as shown. In this way, the handle 11 is better supported. The rear portion of the bottom 13 must be built up to form part of the space that holds the gravel. Thus, side walls 22 are welded to the sides of the bottom as shown. The back plate 13b is shown attached to the base plate. The back plate 13b is cut to fit the curve of the bottom 13 and is welded to make a water-tight seal.

Figure 6:
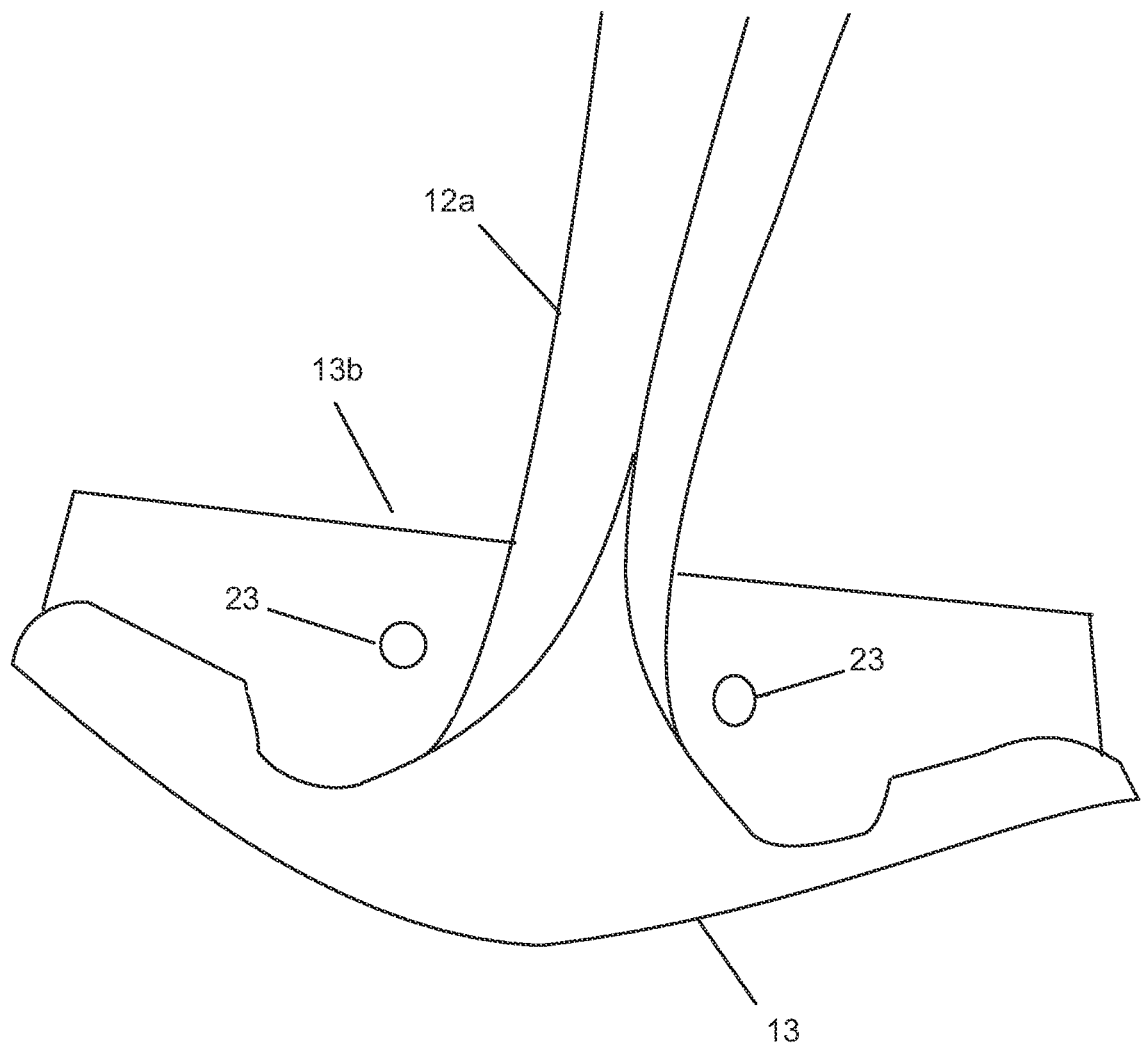
FIG. 6 is a rear detail view of the shovel showing the back plate being positioned on the shovel prior to welding.

FIG. 6 is a rear detail view of the shovel showing the back plate 13b in position on the shovel. Note the curved portions on the bottom 13 that the back plate 13b is cut to fit. Note too, that two holes 23 are formed in the back plate 13b as shown, to secure the back portion of the hinge 19.

Figure 7:
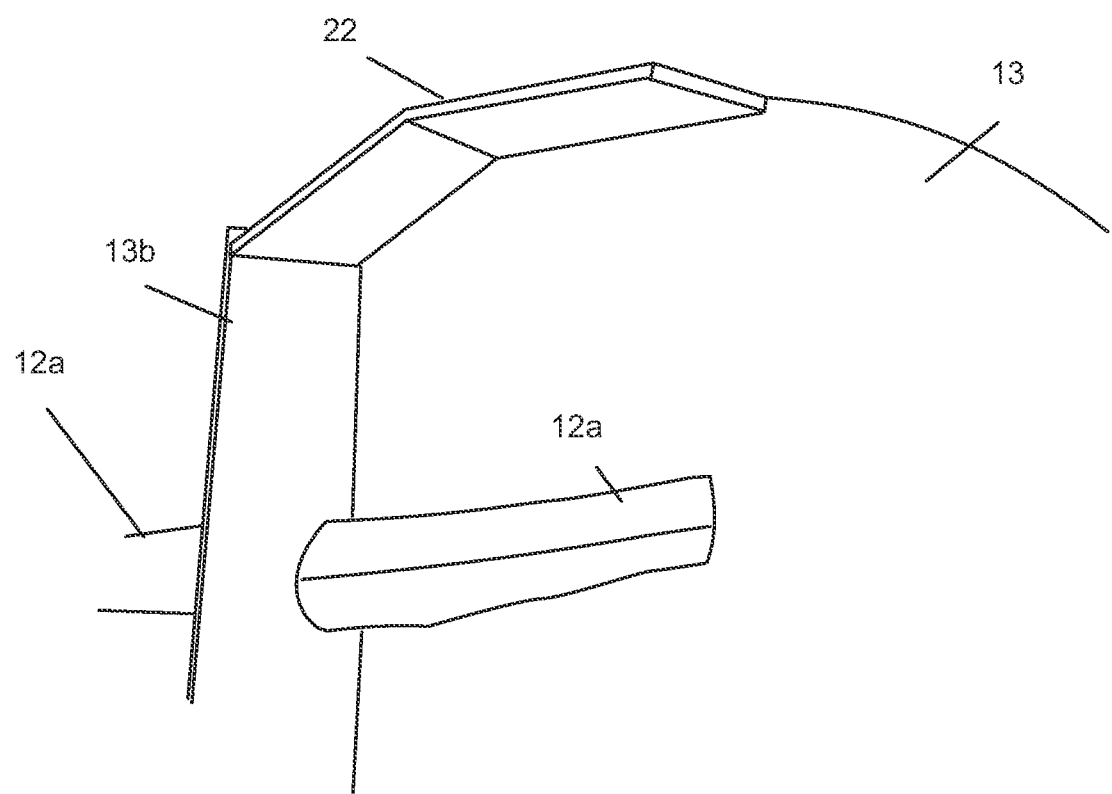
FIG. 7 is a front partial view of the shovel base with the back plate and one of the side walls.

FIG. 7 is a front partial view of the shovel bottom 13 and socket 12a with the back plate 13b and one of the side walls 22. Note how the back plate 13b is shaped to fit over the socket.

FIG. 8 is a detail view of the inside of the lid 14a showing the buildup of walls 14b on the front and sides of the lid along with a center support 14c. Note that the side walls 14b are stepped. The front portion being wider than the rear portion. See also, FIG. 2. Note too, the three ends 24 of the rivets 21 that are used to secure the hinge to the top 14.

Figure 9:
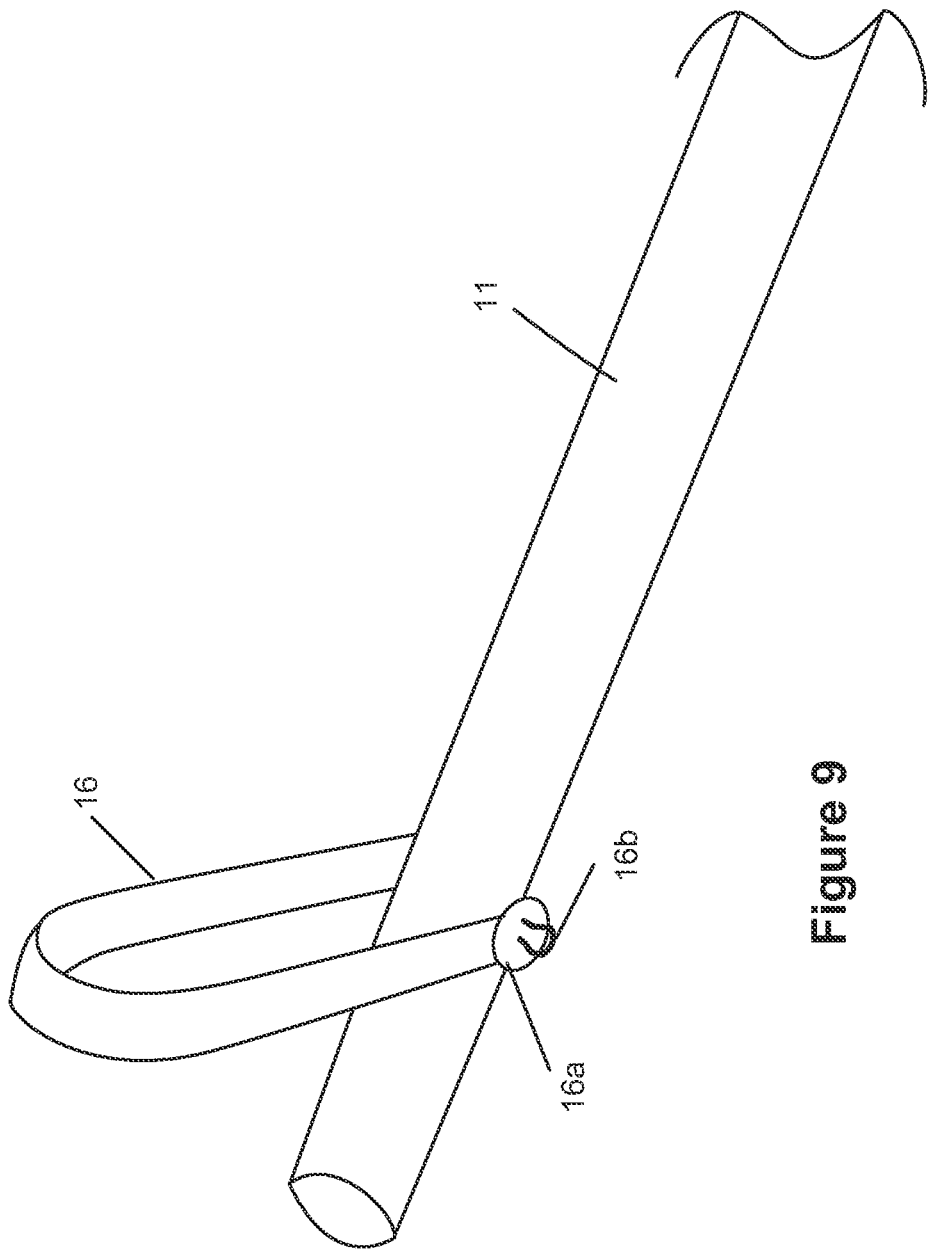
FIG. 9 is a detail view of the pivoting handle.
Figure 10:
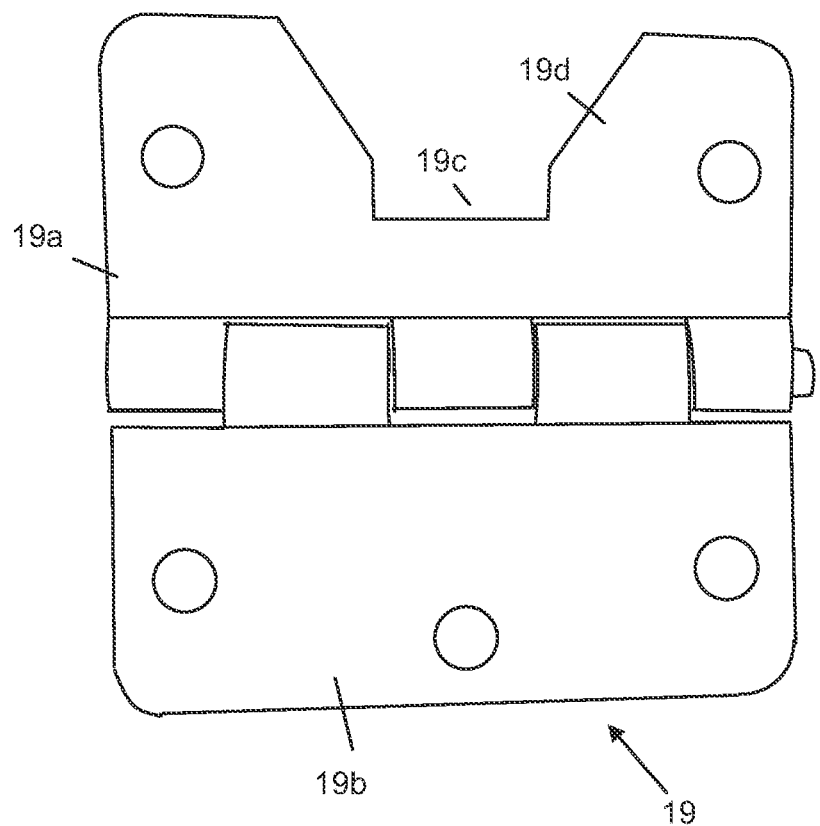
FIG. 10 is a detail view of the hinge prior to welding.

FIG. 9 is a detail view of the pivoting handle 16 attached to the handle 11. The pivoting handle 16 is attached to the handle 11 with a washer 16a that is secured by a clip 16b. FIG. 10 is a detail view of the hinge 19 prior to mounting to the device. The hinge 19 has a lower portion 19a that is attached to the back plate, as discussed above. Note that the lower portion of the hinge 19a is notched at 19c, with sides 19d, to allow it to fit over the socket 12a. The upper part of the hinge 19b, is attached to the top 14. This can be attached by rivets 21 or by welding. Fasteners such as nuts and bolts, can be used but are not preferred as they require maintenance to ensure they remain tight at all times.

Figure 11:
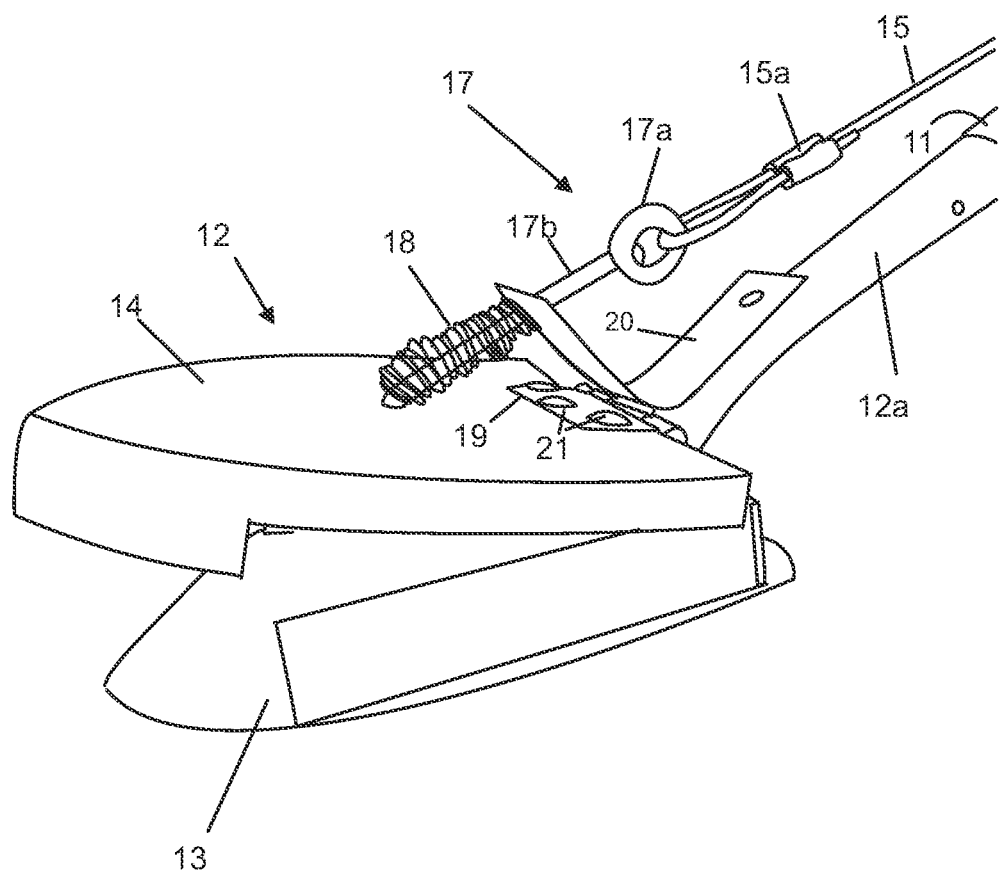
FIG. 11 is a detail view of the shovel head showing the top open.

FIG. 11 is a detail view of the shovel head 12 showing the top 14 open. The bottom 13 is shown as well. The top is opened by a cord 15 and a pivoting handle 16 (see FIG. 1). The cord 15 is attached to a spring-loaded rod 17 as shown. Note the spring 18. The eye 17a is shown attached to the rod 17b. The hinge 19 is shown as well as the three fasteners 21. Also note the bracket 20, the socket 12a, and the handle 11.

Note that, in this figure, the cord 15 is made of a wire that is looped through the eye 17a and is crimped by a crimp fitting 15a.

As shown, the top is open, and the shovel is ready to dig into the gravel bed. Once a load of gravel is picked up the shovel top is then closed by pushing pivoting handle 16 forward allowing the spring 18 to close the top 14. Once closed, the shovel is removed from the water and the load of gravel in it can then be examined for minerals.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A hand shovel for placer mining comprising:
    a) a handle having a proximate end and a distal end;
    b) a head having a socket extending rearwardly therefrom, the head attached to the proximate end of said handle via the socket, said head having a bottom having a front portion and a back portion, and a top having a front portion and a back portion, said top being hingably attached to said bottom;
    c) a rod, having a proximate end and a distal end, said proximate end of said rod being attached to the top and extending upwards therefrom, and the distal end having an eye thereon;
    d) a pivoting handle attached to the distal end of said handle;
    e) a length of line having a first end and a second end, the first end of said length of line being attached to the eye of said rod and the second end of said length of line being attached to said pivoting handle;
    f) a bracket, attached to said socket and extending upwardly therefrom, said bracket having a slot formed therein such that the eye of said rod passes through said bracket; and
    g) a spring, slidably attached to said rod and being positioned between said bracket and said top of said head.

2. The hand shovel for placer mining of claim 1 wherein the socket is formed on the bottom of said head.

3. The hand shovel for placer mining of claim 1 wherein the pivoting handle has a first position and a second position.

4. The hand shovel for placer mining of claim 3 wherein when said pivoting handle is in said first position, said top is closed, and when said pivoting handle is in said second position, said top is open.

5. The hand shovel for placer mining of claim 1 wherein said bottom of said head further comprises a pair of side walls extending upwardly from the back portion of said bottom, and a back plate, attached to the back portion of said bottom and also extending upwardly therefrom.

6. The hand shovel for placer mining of claim 5 wherein the top of said head has a pair of side walls attached to the front portion of said top and extending downwardly therefrom.

7. The hand shovel for placer mining of claim 6 wherein the pair of side walls extending upwardly from the back portion and the pair of side walls attached to the front portion of said top and extending downwardly therefrom enmesh to form a box when said top is closed.

8. A hand shovel for placer mining comprising:
    a handle having a proximate end and a distal end;
    a shovel head, the shovel head attached to the proximate end of said handle, said shovel head having a bottom having a front portion and a back portion, and a top having a front portion and a back portion, said top being hingably attached to the back portion of said bottom;
    a rod, having a proximate end and a distal end, said proximate end of said rod being attached to the top and extending therefrom;
    an actuator attached to said handle;
    a length of line having a first end and a second end, the first end of said length of line being attached to the distal end of the rod and the second end of said length of line being attached to the actuator such that operating the actuator pulls on the length of line and the rod, thereby lifting the top; and
    a bracket, attached to the bottom of the shovel head and extending upwardly therefrom, said bracket having an opening formed therein such that the rod or the length of line passes through said bracket.

9. The hand shovel for placer mining of claim 8 further comprising a spring, slidably attached to said rod and being positioned between said bracket and said top of said shovel head.

10. The hand shovel for placer mining of claim 8 wherein the rod has an eye formed on the distal end of the rod, and wherein the first end of the length of line is attached to the eye of the rod, the opening of the bracket being configured to allow the eye to pass through the opening.

\* \* \* \* \*